US008689495B2

(12) United States Patent
Hill et al.

(10) Patent No.: US 8,689,495 B2
(45) Date of Patent: Apr. 8, 2014

(54) PROTECTIVE SHELTER (75) Inventors: Scott Patrick Hill, Monroe, WA (US);
Julian Stephen Sharpe, Mukilteo, WA (US)

(73) Assignee: Survival Capsule, LLC, Mukilteo, WA (US)

( * ) Notice: Subject to any disclaimer, the term of this patent is extended or adjusted under 35 U.S.C. 154(b) by 0 days.

(21) Appl. No.: 13/523,171

(22) Filed: Jun. 14, 2012

(65) Prior Publication Data
US 2013/0014452 A1 Jan. 17, 2013

Related U.S. Application Data (63) Continuation of application No. 13/486,417, filed on Jun. 1, 2012, now abandoned.

(60) Provisional application No. 61/506,536, filed on Jul. 11, 2011.

(51) Int. Cl.
*E04H 1/00* (2006.01)
*E04H 3/00* (2006.01)
*E04H 5/00* (2006.01)
*E04H 6/00* (2006.01)
*E04H 14/00* (2006.01)

(52) U.S. Cl.
USPC ........................................................ 52/79.1

(58) Field of Classification Search
USPC .................... 52/79.1, 169.6, 167.5; 248/183.1
See application file for complete search history.

(56) References Cited

U.S. PATENT DOCUMENTS

| | | | | |
|---|---|---|---|---|
| 3,943,671 | A * | 3/1976 | Curci | 52/69 |
| 4,955,166 | A * | 9/1990 | Qualline et al. | 52/169.6 |
| 5,097,640 | A * | 3/1992 | Skolnick et al. | 52/81.3 |
| 5,297,761 | A * | 3/1994 | Kendall et al. | 244/140 |
| 5,394,661 | A * | 3/1995 | Noble | 52/167.4 |
| 5,980,256 | A * | 11/1999 | Carmein | 434/55 |
| 6,085,475 | A * | 7/2000 | Parks et al. | 52/169.6 |
| 6,349,508 | B1 * | 2/2002 | Ju et al. | 52/79.1 |
| 6,434,896 | B1 * | 8/2002 | Mitchell | 52/169.6 |
| 6,642,906 | B1 * | 11/2003 | Machalek | 343/872 |
| 6,938,381 | B1 * | 9/2005 | Villa | 52/79.1 |
| 7,856,762 | B2 * | 12/2010 | Deisenroth et al. | 52/79.1 |
| 7,913,462 | B2 * | 3/2011 | Woodcock | 52/80.1 |
| 2007/0074462 | A1 * | 4/2007 | Linares | 52/79.1 |
| 2007/0094943 | A1 * | 5/2007 | Deisenroth et al. | 52/79.1 |
| 2008/0196348 | A1 * | 8/2008 | Woodcock | 52/650.2 |
| 2009/0307993 | A1 * | 12/2009 | Serrano | 52/79.1 |

OTHER PUBLICATIONS

"Tsunami Survival Capsules Offer Hope for Japan's Next Great Wave," downloaded on Jun. 13, 2012 from http://inventorspot.com/articles/tsunami_survival_capsules_offer_hope_japans_next_great_wave.

(Continued)

*Primary Examiner* — Brian Glessner
*Assistant Examiner* — Paola Agudelo
(74) *Attorney, Agent, or Firm* — Sughrue Mion, PLLC (57) ABSTRACT

Protective shelters for enclosing one or more persons and/or animals are described. A capsule can be a spherical or substantially spherical, water-tight shell surrounding a frame and forming an interior portion which accommodates the one or more persons and/or animal; and at least one sealable entry door configured to seal at least one opening formed in the shell.

25 Claims, 7 Drawing Sheets (56) References Cited

OTHER PUBLICATIONS

"Mini-Noah's Ark Japan's answer to next tsunami," downloaded on Jun. 12, 2012 from http://www.cbc.ca/news/world/story/2011/09/30/noah-ark-japan-tsunami.html.

"Small Japanese factory has answer to next quake and tsunami: Noah's Ark shaped like a ball." The Associated Press. Downloaded on Jun. 12, 2012 from http://www.680news.com/news/world/article/283381—small-japanese-factory-has-answer-to-next-quake-and-tsunami-noah-s-ark-shaped-like-a-ball.

Deep Earth Bunker: Tsunami Pods. Downloaded on Jun. 12, 2012 from http://www.deepearthbunker.com/tsunami-pods.html.

"Tsunami Survival Capsule." Tech Briefs Create the Future Design Contest 2012. Downloaded on Jun. 12, 2012 from http://contest.techbriefs.com/component/content/article/1472.

* cited by examiner

SECTION A-A
FIG. 1D

PROTECTIVE SHELTER

CROSS-REFERENCE TO RELATED APPLICATIONS

This application is a continuation of U.S. patent application Ser. No. 13/486,417, filed on Jun. 1, 2012, which claims priority to U.S. Provisional Application No. 61/506,536, filed on Jul. 11, 2011. The entire contents of the above-mentioned applications are incorporated herein by reference.

BACKGROUND

1. Technical Field

The subject matter discussed herein relates generally to shelter and, more particularly, to protective shelters.

2. Background Information

Human shelters (e.g., houses) are designed for utility and comfort with adequate protection against various weather-related elements, such as wind, rain, sun, snow, sand storm, flood, etc.

However, adequate protection in normal situations or conditions may be inadequate in situations or conditions that are not normal. For example, human shelters may not protect humans and/or animals in an emergency (e.g., hurricane, earthquake, tsunami, flood, etc.). Human shelters do not provide adequate protection against a tsunami, even if these shelters are not damaged by one or more earthquakes that may precede the tsunami. Human shelters are not designed to protect humans and/or animals against the forces and volume of water encountered during a tsunami event.

Thus, there is a need for protective shelters that protect humans and/or animals in abnormal circumstances, such during a tsunami event.

SUMMARY

Protective shelters for enclosing one or more persons and/or animals are described. The subject matter includes a capsule with a spherical or substantially spherical, water-tight shell surrounding a frame and forming an interior portion which accommodates the one or more persons and/or animal. The capsule includes at least one sealable entry door configured to seal at least one opening formed in the shell.

DETAILED DESCRIPTION

The subject matter described herein is taught by way of example embodiments. Various details have been omitted for the sake of clarity and to avoid obscuring the subject matter. Examples shown below are directed to structures and functions of protective shelters. To avoid obstructing the features of the drawings, if there is more than one of the same feature (e.g., three legs), not all of the same features are identified or labeled with a reference numeral (e.g., a reference numeral identifies only one or two of the three legs).

Figure 1A:
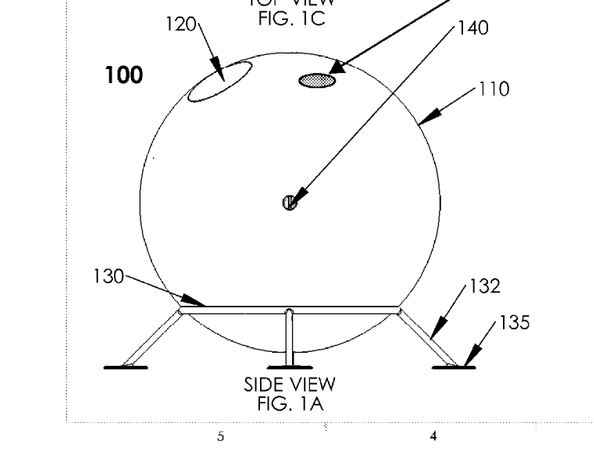
FIGS. 1A-1C show different views of an example protective shelter.
Figure 1B:
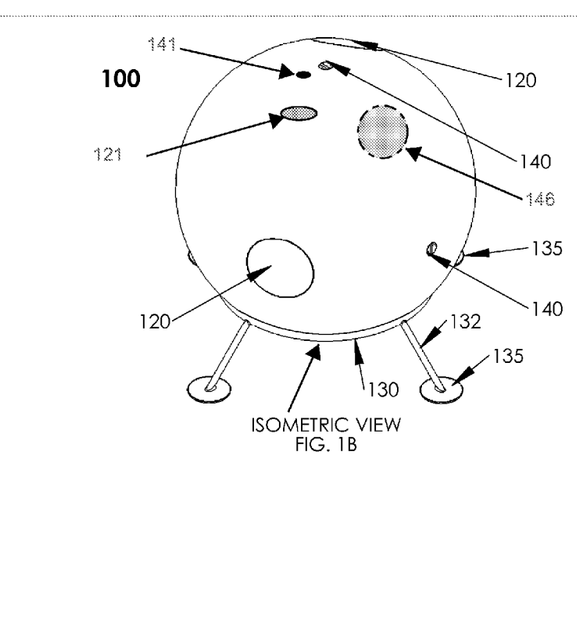
Figure 1C:
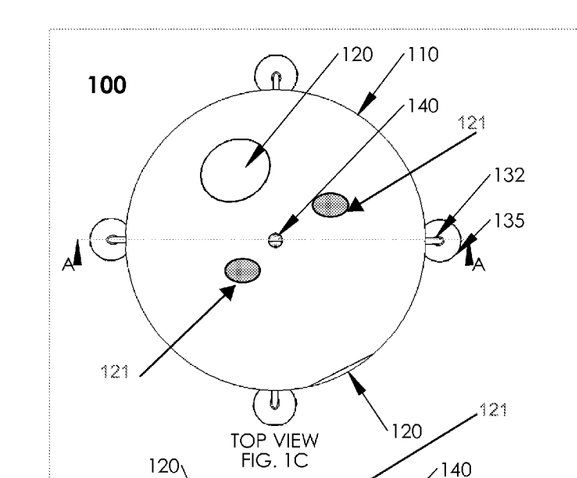

FIGS. 1A-1C show different views of an example protective shelter 100. FIG. 1A shows the side view of the example protective shelter. FIG. 1B shows the isometric view of the example protective shelter. FIG. 1C shows the top view of the example protective shelter. A shelter (e.g., shelter 100) may be referred to as a capsule, container, cabin, enclosure, or the like. Shelter 100 includes shell 110, one or more doors 120, one or more vents 121, windows or portholes 146, and optional base stand 130. Base stand 130 may be any structure able to support shelter 100. Some models of base stand 130 may have three or more legs 132. Legs 132 may have feet 135. Shelter 100 may include one or more features visible externally, such as attachment points 140. Attachment points 140 may be used, for example, to attach, hook, or latch onto shelter 100 for anchoring shelter 100 in place or hoisting or rescuing shelter 100 (e.g., from a debris field or the ocean). Shelter 100 may also include a beacon 141 such as a light beacon.

Shelter Shapes

Shelter 100 may be constructed according to targeted specifications, protections, and/or risk levels. For example, one set of specifications (e.g., specifications for protective shelters in coastal areas) may be for providing shelters with higher strength capability for lower amount of cost in materials and manufacturing. For this set of example specifications that put emphasis on strength, shelters may be constructed in a spherical-looking shape to take advantage of the strength capability of a sphere.

A sphere is an inherently strong shape able to withstand high pressure (e.g., from a large body of water). The curved or generally curved surfaces of a sphere provide deflection of, for example, impacting objects, thus reducing the possibility of a sharp object penetration occurrence. A sphere minimizes the initial impacting force associated with a large body of water (e.g., caused by a tsunami event). A spherical shaped capsule allows the capsule to free itself from obstacles. For example should the capsule become wedged in debris, mud, or sand; or forced below the surface of a tsunami wave, it has the ability to self-free and rise to the surface.

The term "sphere" or "spherical" is referred to a shape that may be, but does not have to be, a mathematically-precise sphere. For example, there may be straight or substantially straight lines between two points on the sphere (e.g., the beams may be constructed from of straight or substantially straight segments and/or the shell of the sphere may be constructed from straight or substantially straight panels, each may have a length about ⅙ or less of the circumference of the sphere). A spherical shelter can be substantially spherical or spherical looking.

A sphere and sphere-looking shape are illustrated in the enclosed figures. However, protective shelters are not limited to the shapes shown. For example, a shelter may be in a shape, a cross section of which may be an oval. (e.g., an olive-shaped shelter, egg-shaped shelter, saucer-shaped shelter, a tube-shaped shelter, etc).

Protective shelters may be finished with a high visibility surface finish (e.g., bright orange or red). During storage protective shelters may be camouflaged with a colored cover.

Figure 1D:
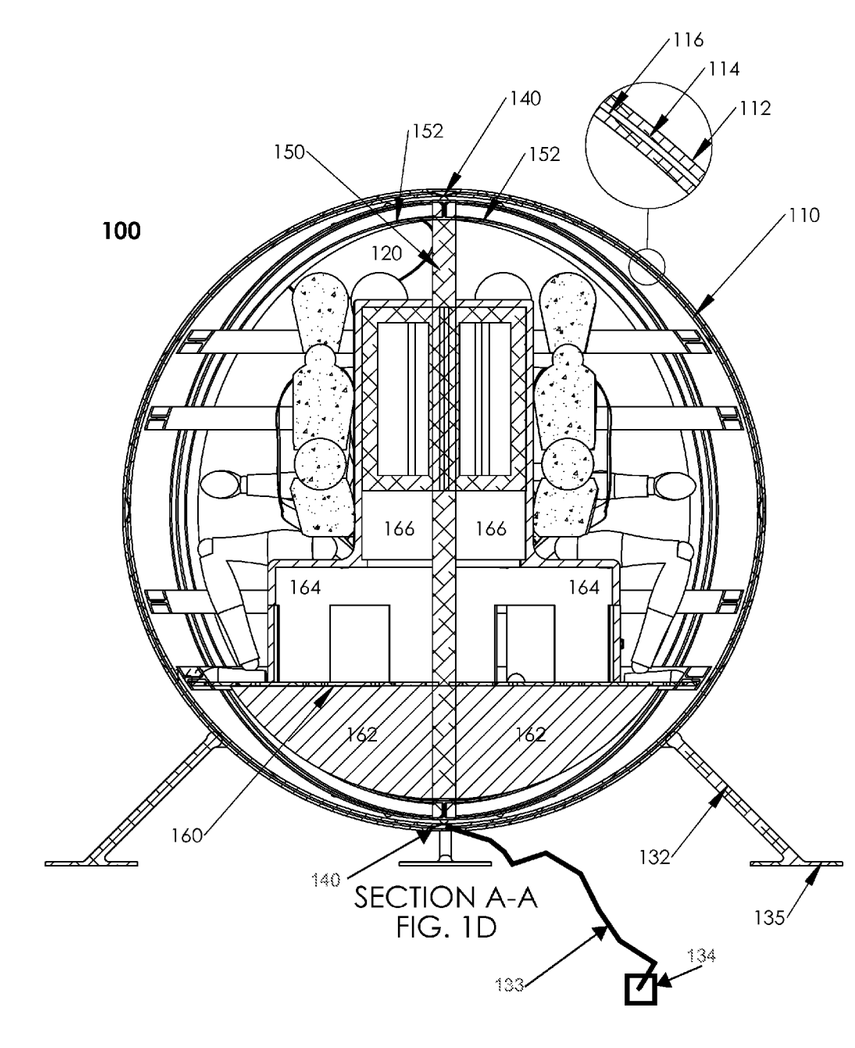
FIG. 1D shows a cross-section of the example protective shelter of FIG. 1C.

In some situations, protective capsules may be anchored or tethered to a stationary point or location. For example, as shown in FIG. 1D, a tether system can be used to tie a capsule (e.g., to an attachment point 140) to an anchor 134 to prevent the capsule from being washed out to the sea. An example anchor 134 may be a large concrete block, which may be buried in the ground, located near the capsule. Mounted on the block may be a steel cable winch system. As the capsule is engaged by, for example, the initial wave of a tsunami, the cable 133 is deployed against an attenuation system within the winch. This helps reduce initial impact. As the water recedes, the capsule comes to rest in roughly the same location.

Shelter Uses

The tsunami event discussed above is only an example. Protective shelters or capsules may be used in any event, condition, environment, situation, etc. where and/or when protection of humans and/or animals are needed. For example, in natural disasters such as hurricanes tethered capsules, tornadoes (tethered capsules), flooding (rivers, lakes, low coastal areas, etc.), fires (with internal cooling), avalanches, landslides, earthquakes, etc. Protective capsules or protective frames may be used in sports, thrill rides, etc. (e.g., spinning, swinging, bungee rides, and/or other events that benefit from or require protective enclosures to protect the participants). Depending on the intended uses, protective shelters may have water-tight and/or air-tight shells or may not have water-tight shells. "Water-tight" and "air-tight" may be approximately or substantially water tight and air tight, respectively. For example, the shell, the door, and/or the seal between the shell and the door may have small openings or holes either purposely (e.g., valves or one-way valves) or consequentially due to usage or age.

FIG. 1D shows a cross-section of the example protective shelter of FIG. 1C. Shelter 100 is shown with a center post 150, three or more vertical beams 152, zero or more horizontal beams 154 (intercostal beams), a floor 160, one or more ballasts 162, seats 164, seatbacks 166, and safety harness 168 (e.g., five-point seatbelt system). Some shelters may include cushioned head restraints (not shown) positioned above seatbacks 166 to provide upper body support during, for example, the more dynamic initial phase of the tsunami event.

The seats 164 and seatbacks 166 may provide storage space (e.g., storing supplies, tools, food, water, beacon, transponder, oxygen supply, radio, flashlight, batteries, first-aid kit, etc.). Shelter 100 may include other features (not shown), such as one-way venting valve(s) 121, water pump and one-way water valve(s), viewing port holes or windows 146, etc.

Shell 110 may include an outer skin 112 (outer layer), one or more middle layers 114 (e.g., a thermal protection layer, radiation protection layer, buoyancy layer, insulation layer, etc.), and an inner skin 116 (inner layer). Some capsule designs may have fewer layers (e.g., no inner skin and/or middle layers).

Shelter 100 is an example of a capsule with an internal frame (e.g., of vertical beams 152 and optional horizontal beams 154) and shell 100. In some designs, shelters may have external frames (not shown). In other designs, shelters may have frames (not shown) between the outer skin 112 and inner skin 116.

A protective capsule (e.g., shelter 100) provides protection and shelter before, during, and after an extraordinary event (e.g., tsunami event). Each capsule may accommodate from one to many persons (e.g., two, four, five, six, eight, 12, etc.). Capsules may be constructed to accommodate even higher occupancy. FIG. 1D shows an example capsule designed to house and/or protect six persons.

Materials

Protective shelters may be constructed in any manner with suitable materials based on specifications. For example, a set of specifications for constructing tsunami capsules may call for materials that are strong and light weight, which provide protection against tsunami waves and debris field. For the tsunami example, one or more materials, such as aluminum, stainless steel, graphite composite, plastic, and the like may be used. For example, outer skin 112 may be formed as an aluminum honeycomb sandwich core with aluminum face sheets and aluminum honeycomb. Middle layers 114 may be, for example, a foam layer for thermal protection and or buoyancy. The inner layer 116 may be a skin made with aluminum, plastic, composite, etc.

Internal structure (e.g., center post 150, vertical beams 152, horizontal beams 154, floor 160, seats 164, and seatbacks 166) may be formed using light-weight materials (e.g., plastics, composite, and/or light-weight alloys). Vertical beams 152 and/or horizontal beams 154 may be hollow beams, tubes, "I" beams, and the like. There may be holes along the beams to reduce weight further. A light-weight structure helps keep the overall weight down and provide a low center of gravity to ensure a positive righting force which controls the orientation and attitude of the capsule (e.g., self-right). A low external surface friction further helps on self-righting.

The ballasts 162 may be constructed in any manner using any material or combination of material. In some models of protective shelters, ballasts 162 may be tanks (e.g., stainless steel tanks) for containing liquid, solid, and a combination thereof. For example, one tank may be designed for holding and providing drinking water and another tank may be designed for holding bio waste. In other models of protective shelters, one or more ballasts 162 may be solid weights or tanks with solid bottoms. For example, one or more ballasts 162 or portion of ballasts 162 may be solid concrete, metal (e.g., lead). Ballasts 162 help control the position of the center of gravity to provide stability to some models of protective shelters (e.g., the self-righting models or models that may not be tied to an anchor).

Figure 2:
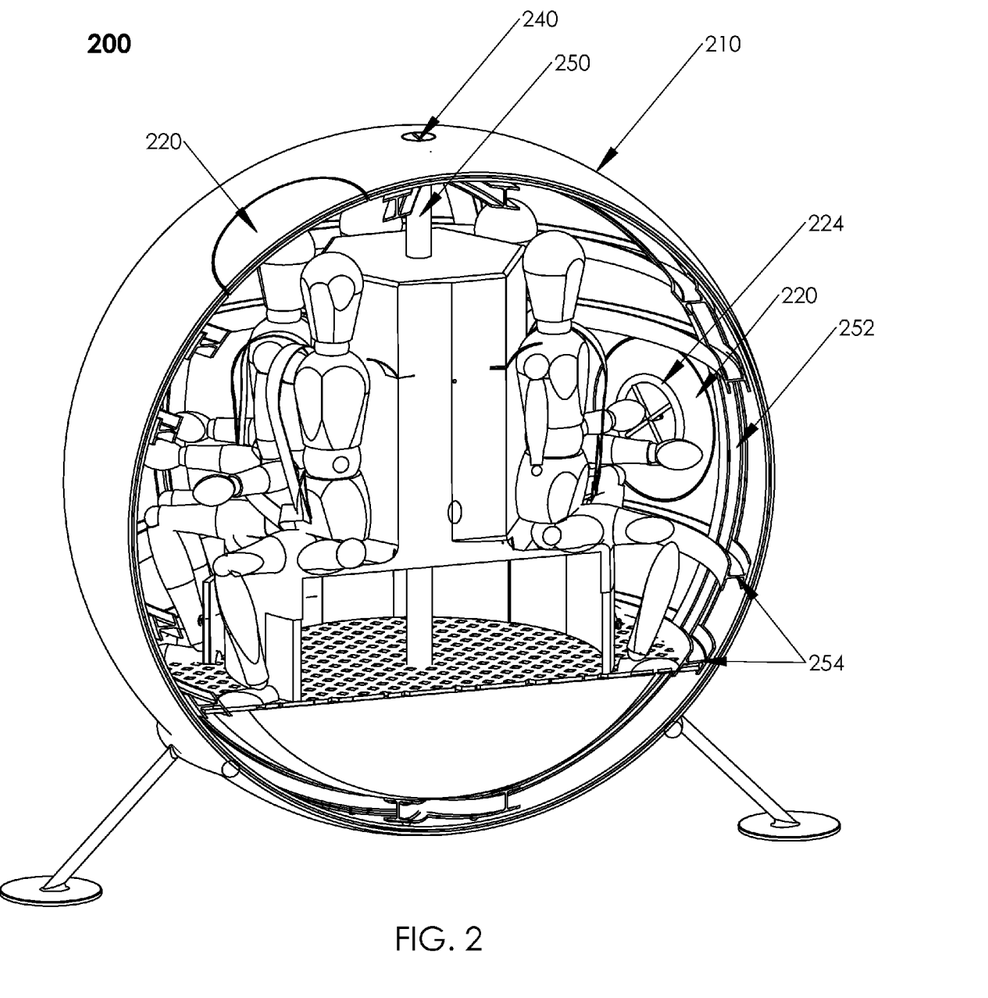
FIG. 2 shows an example protective shelter and some of its features.

FIG. 2 shows an example protective shelter and some of its features. The example shelter 200 shows two doors 220, which may be positions such as to minimize the event of both doors being blocked from exiting. Doors 220 may be air tight and/or water tight. Doors 220 may be the same design (e.g., same size, design, functions, etc) or different designs. For example, the size of the doors may be different (e.g., one bigger than the other). The shape of the doors may be different (e.g., one door may be somewhat rectangular with curled corners). One door may be open inwards, and the other door may be open outwards.

Each of doors 220 includes a latching mechanism (e.g., lock wheel 224) for opening, closing, securing, and/or sealing the door. Lock wheel 224 provides a secure manually operated lock mechanism which engages restraints such as to eliminate door seal failure. The latching mechanism may be removable in some models. For a free-rolling shelter (e.g., one with roller balls, described below) the door and latching mechanism are designed to allow the free rolling of the internal structure. For example, the door and latching mechanism may be flushed with the inner skin to form continuous rolling curve lines.

A door may open inwards or outwards. One or more doors 220 may be open from the outside to allow, for example, rescuers to rescue occupants in situations where the occupants may not be able to open the door from the inside.

One or more attachment points 240 may be provided in strategic locations on the capsule outer surface and coupled to the center post 250 and/or internal beams (e.g., vertical beams 252 and optional horizontal beams 254) for strength and support.

Figure 3:
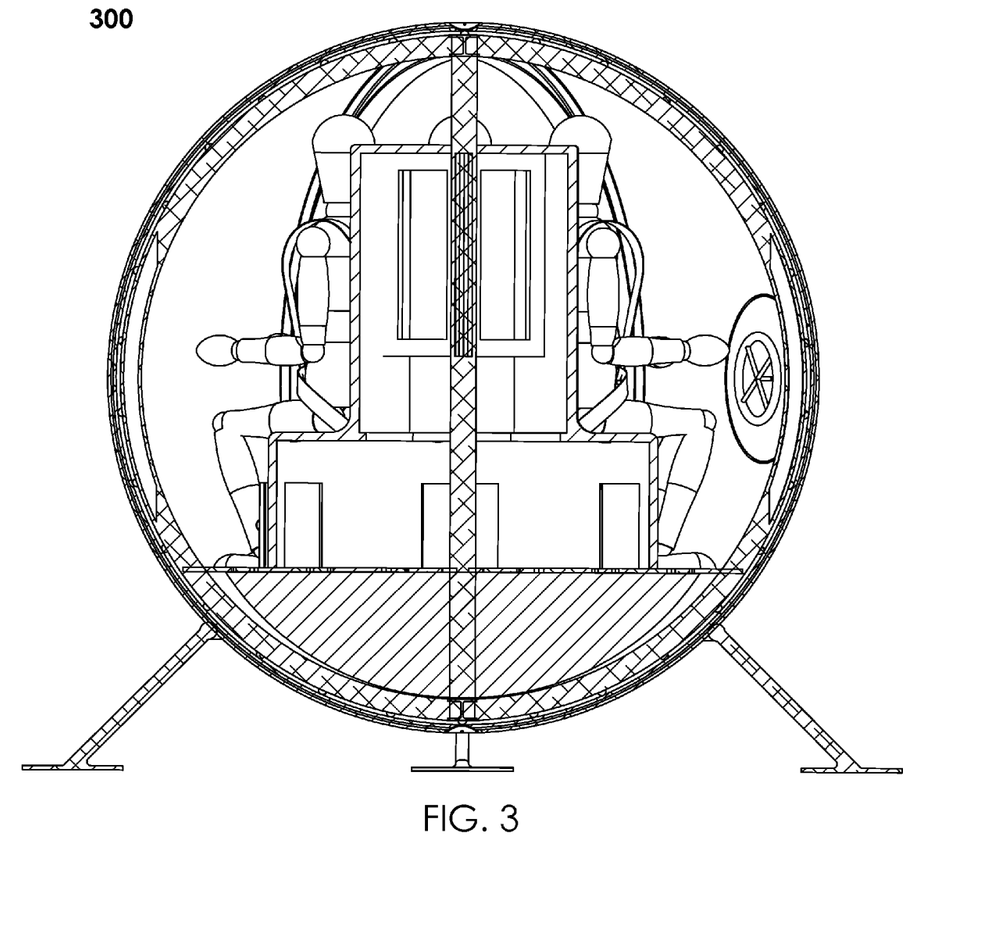
FIG. 3 shows another example protective shelter.

FIG. 3 shows another example protective shelter. Shelter 300 is an example of a four-person shelter and an example of a shelter with no horizontal beams. This example shelter and other example shelters described herein may include air supply (e.g., a pressurized air supply) for providing breathable air.

Figure 4:
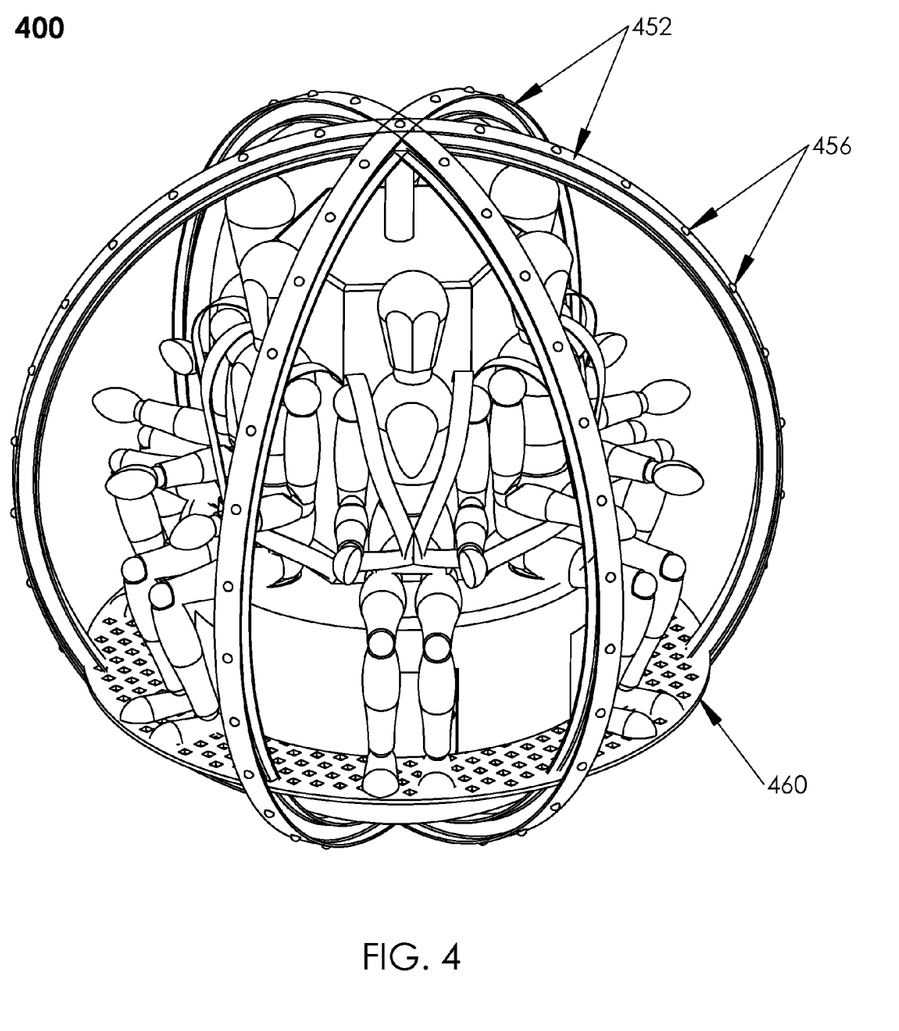
FIG. 4 shows an example internal structure of an example protective shelter.

FIG. 4 shows an example internal structure of an example protective shelter. Internal structure 400 is an example of self-righting internal structure of a shelter (the shell of the structure is not shown). Roller balls 456 may be installed in spaced-out positions of vertical beams 452. Roller balls 456 allow the internal structure 400 to move (e.g., roll) freely in any direction with respect to the shelter shell (not shown). Roller balls 456 may be referred to as ball runners, ball bearings, or bearings.

The free-rolling internal structure 400 and self-righting features described above (e.g., occupants, light-weight materials, and heavy bottom ballasts) make internal structure 400 self righting. For example, during a tsunami event, a shelter with internal structure 400 may be rolling down an embankment, rocking on the ocean surface, or in another condition. Regardless of the movement and direction of movement of the shelter, internal structure 400 freely rotates about all three axes inside the shell of a shelter (not shown) to self-adjust its position to maintain an upright position of the occupants in the shelter.

Floor 460 may include numerous openings or holes to reduce the weight of the floor and provide water drainage (e.g., spilled drinking water or water splashed in when occupants enter the shelter).

Figure 5:
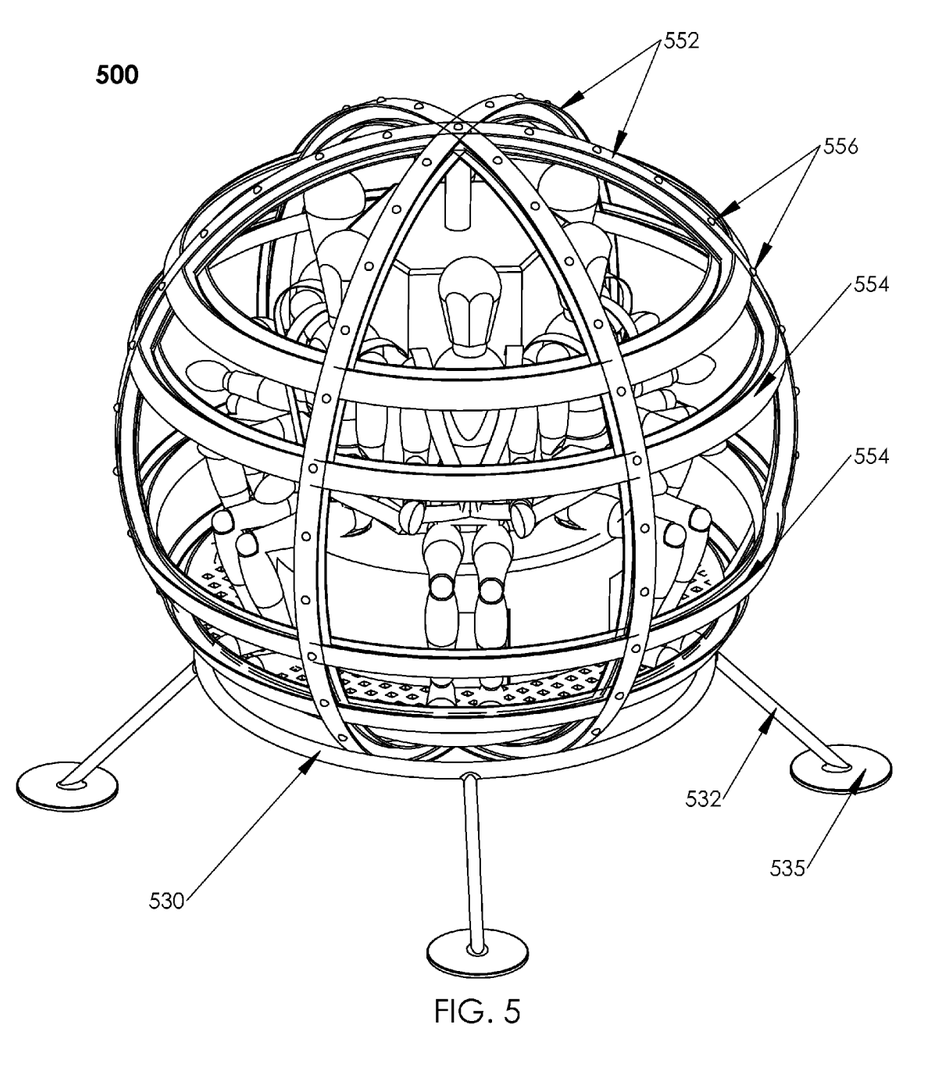
FIG. 5 shows another example internal structure of an example protective shelter.

FIG. 5 shows another example internal structure of an example protective shelter. Internal structure 500 is another example of self-righting internal structure of a shelter (the shell of the structure is not shown). Internal structure 500 includes vertical beams 552, horizontal beams 554, and roller balls 556, which are shown on vertical beams 552. In some examples, roller balls 556 may be installed on horizontal beams 554, either exclusively or in addition to some roller balls 556 installed on the vertical beams 552. Roller balls 556 allow the internal structure 500 to move (e.g., roll) freely in any direction with respect to the shelter shell (not shown).

Internal structure 500 is shown sitting on (e.g., supported by) a stand 530 with three or more legged base structure 535. Stand 530 may be, for example, a ring stand with three or more legs. In some designs, internal structure 500 may be tethered to stand 530, which in turn may be securely anchored in place (e.g., on the ground or a heavy concrete block.).

Figure 6:
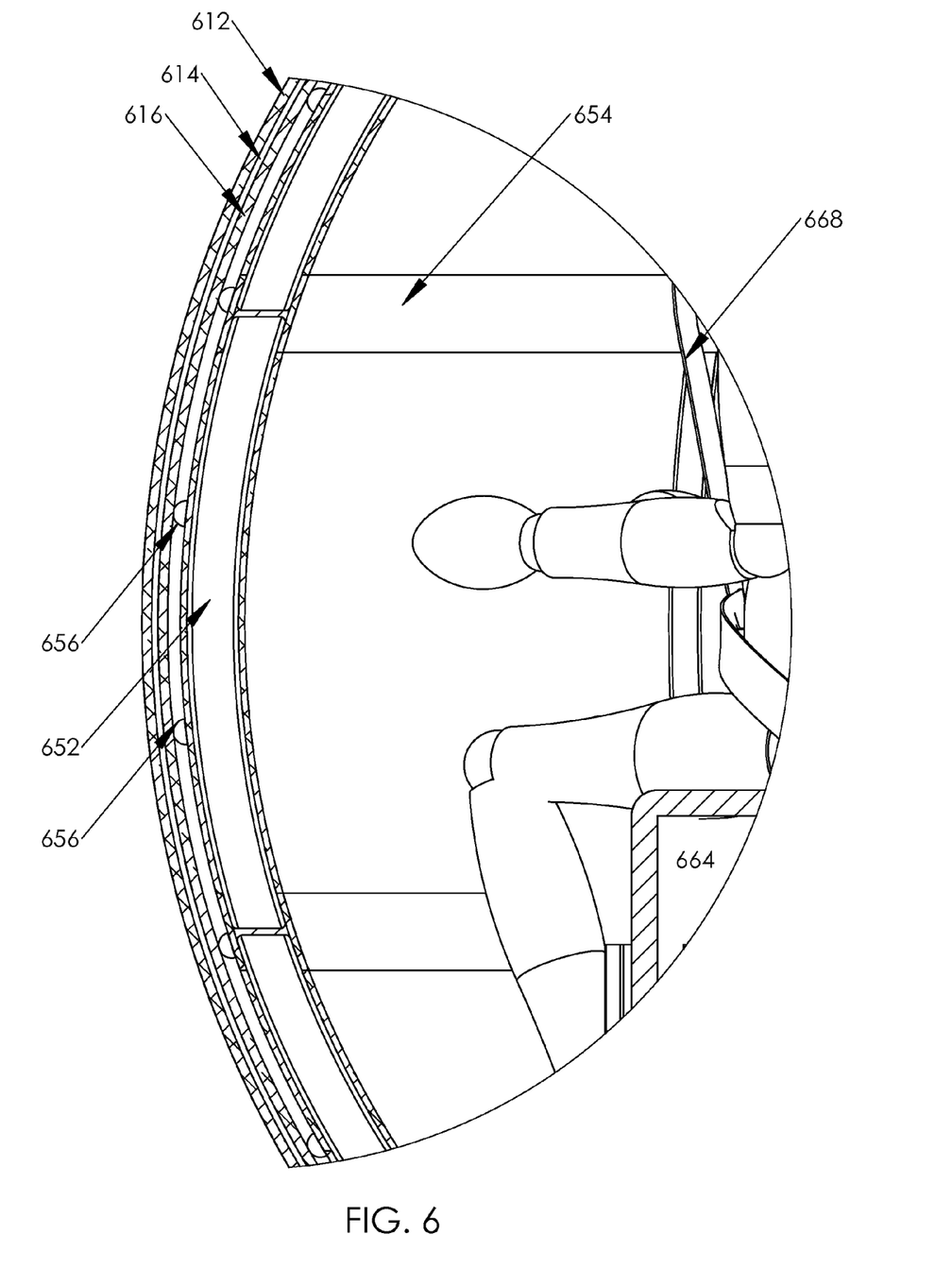
FIG. 6 shows the inner structure of a protective shelter and some of its features.

FIG. 6 shows the inner structure of a free-rolling protective shelter and some of its features. FIG. 6 shows outer skin 612, middle layer(s) 614, inner skin 616, vertical beams 652, horizontal beams 654, roller balls 656, seat 664, and safety harness 668. The vertical beams 652 and horizontal beams 654 may be connected, joined, or attached in any manner to form a rigid frame structure or cage. The outer skin 612 provides protection against outside elements. The inner skin 616 functions as a roller surface. One or more middle layers 614 may be a thermal blanket, which provides cold and heat protection (e.g., weather elements and/or abnormal events, such as a debris field catches on fire).

Although a few example shelters and associated features have been shown and described, these examples are provided to convey the subject matter described herein to people who are familiar with this field. It should be understood that the subject matter described herein may be embodied in various forms without being limited to the described examples. The subject matter described herein can be practiced without those specifically defined or described features or with other or different elements or features not described. It will be appreciated by those familiar with this field that changes may be made in these examples without departing from the subject matter described herein as defined in the appended claims and their equivalents.

What is claimed is:

1. A portable capsule for enclosing one or more persons, comprising:
   a frame;
   a substantially water-tight outer most buoyant shell void of external framework attached to said shell having a spherical exterior surface configured to roll on land and float on water, said shell surrounding the frame and forming a single-level interior portion which accommodates the one or more persons, the shell is formed to include at least one opening; and
   at least one sealable door configured over the at least one opening in the shell, the door is configured to be opened and closed.

2. The capsule of claim 1, further comprising one or more ballasts positioned in a floor area of the interior portion.

3. The portable capsule according to claim 2, wherein at least one of said ballasts is operable to provide drinking water to said persons.

4. The capsule of claim 1, wherein an outer surface of the frame includes a plurality of rollers which movingly contacts an inner surface of the shell to provide for movement of the frame and interior portion relative to the shell.

5. The capsule of claim 1, further comprising a central support post connecting opposite sections of the frame from the floor area to a ceiling area.

6. The capsule of claim 1, wherein the interior portion includes one or more seating areas for the one or more persons.

7. The capsule of claim 6, wherein the seating areas comprise restraints for securing the one or more persons to the seating areas.

8. The capsule of claim 1, further comprising at least one attachment point formed on an outer surface of the shell, the at least one attachment point is configured to receive a hook, a connector, a restraining device, a tether, or an anchor.

9. The capsule of claim 8, wherein the attachment point receives a cable secured to the ground which acts as a tether.

10. The capsule of claim 1, further comprising one or more light beacons on the outer surface of the shell.

11. The capsule of claim 1, wherein the frame is a substantially spherical frame which comprises a plurality of beams.

12. The capsule of claim 1, wherein the interior portion includes a pressurized air supply which provides breathable air to the one or more persons.

13. The capsule of claim 1, further comprising a one-way valve formed in the shell to allow discharging air or liquid.

14. The capsule of claim 1, further comprising a viewing window mounted in the shell.

15. The capsule of claim 1, further comprising a base structure upon which the capsule rests in an upright position.

16. The capsule of claim 1, wherein the shell comprises an outer layer and at least one other layer.

17. The capsule of claim 1, further comprising a thermal protection layer inside said water-tight outermost buoyant shell.

18. The capsule of claim 1, wherein the water-tight outermost buoyant shell is made of aluminum.

19. A portable protective shelter, comprising:
   a spherical outer-most exterior buoyant shell void of external frame work attached to said exterior shell, configured to roll on land and float on water and coupled to a frame to form an enclosure for enclosing one or more persons on a single-level; and one or more doors providing access to the enclosure through one or more openings formed in the spherical shell.

20. The protective shelter of claim 19, wherein the frame is an interior frame with respect to the shell.

21. The protective shelter of claim 19, wherein the shell and the one or more doors substantially form a water-tight protection.

22. The protective shelter of claim 21, further comprising at least one one-way valve formed through the shell for expelling air or water.

23. The protective shelter of claim 22, further comprising a water pump for expelling water through the at least one one-way valve.

24. The shelter of claim 19, further comprising a thermal protection layer inside said shell.

25. The shelter of claim 19, wherein said shell is made of aluminum.

* * * * *